United States Patent [19]

Shatuck

[11] 4,422,536
[45] Dec. 27, 1983

[54] TRANSMISSION CONTROL SYSTEM WITH IMPROVED MODULATION RATE REGULATING VALVE

[75] Inventor: Lawrence A. Shatuck, White Heath, Ill.

[73] Assignee: Deere & Company, Moline, Ill.

[21] Appl. No.: 261,844

[22] Filed: May 8, 1981

[51] Int. Cl.³ ............................................. B60K 41/00
[52] U.S. Cl. .................... 192/3.57; 192/3.63; 192/109 F; 74/752 C; 74/335
[58] Field of Search .................... 192/3.57, 3.63, 87.13, 192/, 87.18, 87.19, 109 F; 74/752 C, 335

[56] References Cited

U.S. PATENT DOCUMENTS

| 3,468,194 | 9/1969 | Horsch | 74/753 |
| 3,487,851 | 1/1970 | Golan | 137/494 |
| 3,709,065 | 1/1973 | Starling | 74/753 |
| 3,789,698 | 2/1974 | Williams | 74/752 C |
| 3,799,308 | 3/1974 | Erisman | 192/87.13 |
| 3,882,980 | 5/1975 | Blake | 192/3.57 |
| 3,944,035 | 3/1976 | McRay | 192/3.57 |
| 4,046,160 | 9/1977 | Horsch | 192/3.57 |
| 4,138,004 | 2/1979 | Horsch | 192/109 F |

Primary Examiner—Kenneth Dorner
Assistant Examiner—D. Wright

[57] ABSTRACT

A power shift transmission control system includes a modulation control valve connected for regulating the pressure engagement of forward and reverse direction-friction devices and including a pressure-regulating spring which is adjusted by means of a pressure boost piston. A feedback conduit conveys fluid pressure from the forward or reverse direction-friction device to the chamber, and the rate at which this pressure is conveyed to the chamber is controlled by an orifice-selector valve which is operative to selectively place various sized orifices in the feedback conduit in response to the speed-selector valve being placed in the various speed positions.

5 Claims, 2 Drawing Figures

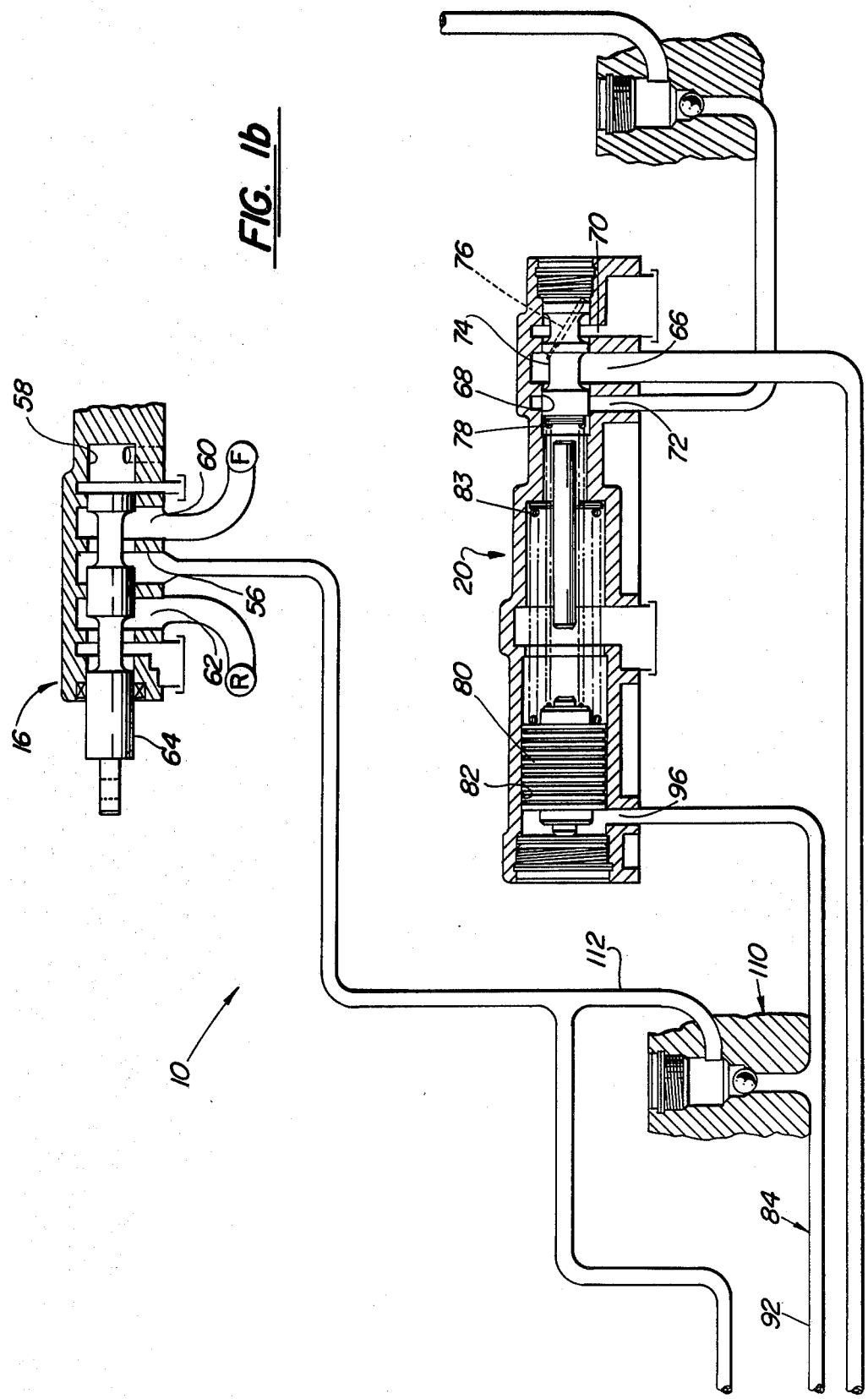

TRANSMISSION CONTROL SYSTEM WITH IMPROVED MODULATION RATE REGULATING VALVE

BACKGROUND OF THE INVENTION

The present invention relates to the control of hydraulic fluid for selectively effecting the engagement of speed and direction-friction devices of a power shift transmission. More specifically, the present invention relates to the control of the rate of modulation of the fluid for effecting engagement of the forward and reverse direction-friction devices.

The desirability of effecting soft shifts in a transmission, in order to avoid wear and tear in the components thereof and also to avoid operator discomfort, is well-known. It is further a well-known expedient to accomplish the above desirable results by modulating the flow of fluid for engaging the friction devices of the transmission. The modulation in the controls of the prior art devices is normally effected by a modulating valve having a spring whose effective length is changed by stroking a modulating piston engaged with one end of the spring each time the transmission is shifted. An example of such a modulating valve can be seen in U.S. Pat. No. 3,487,851, issued to Golan et al on Jan. 6, 1970, wherein there is shown a modulating piston controlled by a source of control fluid which, during the initial movement of the piston, is routed to the piston by a path passing through a pair of restricted passages and then, as the piston moves further, only through one of the restricted passages. Thus, a dual rate of modulation for each shift is obtained.

Another example of a transmission control which employs a pressure-regulating valve, having a piston which is stroked during each shift, is disclosed in U.S. Pat. No. 3,799,308, issued to Erisman on Mar. 26, 1974. The pressure-regulating valve, shown in the Erisman patent, includes a piston through which fluid is routed by means of a series of feedback lines which are in fluid communication with the actuators for each of the friction devices. These feedback lines respectively include various orifices which operate to cause the regulating valve piston to stroke at different rates for each of the different speeds and/or direction combinations.

The present invention is somewhat akin to the control system disclosed in the Erisman patent in that it deals with the idea of effecting different rates of pressure modulation for each of the selected speeds.

SUMMARY OF THE INVENTION

According to the present invention, there is provided a transmission control system embodying an improved modulating rate control for effecting different modulating rates for each of the selected transmission speeds.

A broad object of the invention is to provide a transmission control system, embodying a pressure-modulating valve, including a piston-controlled modulating spring, with the piston being stroked at varying rates for each of the selected transmission speeds. A more specific object of the invention is to provide a power shift transmission control system embodying an orifice-selector valve which is operated simultaneously with a speed-selector valve, the orifice-selector valve acting to place a different orifice in register with a feedback conduit leading to a regulating valve control piston so as to effect a different rate of stroke of the piston for each speed selected.

Yet another object of the invention is to provide a transmission control system wherein only the engagement of the friction devices for effecting direction changes is modulated.

These and other objects will become apparent from a reading of the following description, together with the appended drawings.

BRIEF DESCRIPTION OF THE DRAWINGS

FIGS. 1A and 1B semi-schematically illustrate a power shift transmission control system embodying the present invention.

DESCRIPTION OF THE PREFERRED EMBODIMENT

Figure 1A:
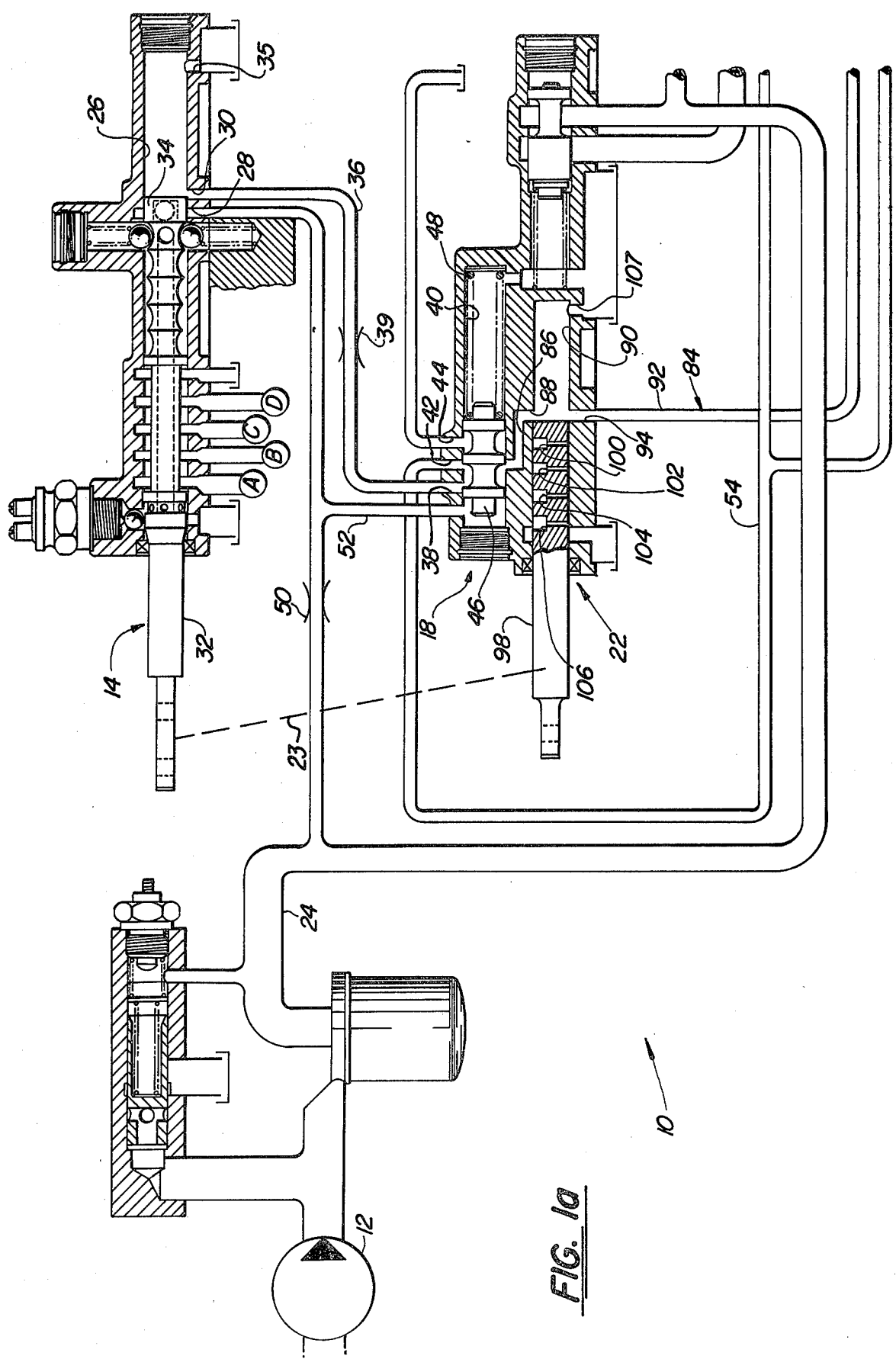

Referring now to the drawing, therein is shown a hydraulic control system 10 for controlling a power shift transmission (not shown) of a type shiftable among four forward and reverse driving speeds by selected engagement of one of first, second, third and fourth speed friction devices indicated here by the letters A, B, C and D, respectively, together with one or the other of a forward and a reverse friction device, here indicated by the letters F and R, respectively. While not shown here, speed and direction inputs to the transmission are preferably done manually through means of a single control lever, of any known construction, which operates in a U-shaped shift gate such that the transmission is respectively placed in forward and reverse driving speeds when the lever is placed in one or the other leg of the U-shaped shift gate and is placed in neutral when the lever is placed in the crossover portion interconnecting the legs of the gate (for example, see U.S. Pat. No. 3,468,194, issued on Sept. 23, 1969). Any other arrangement including single or multiple shifting levers would also be compatible with the present invention providing the transmission is shifted to neutral anytime direction change is made.

The main components of the control system 10 includes a pump 12, a manually operable speed-selector valve 14 for selecting one of the four speed friction devices for engagement, a direction-selector valve 16 for selecting either the forward or the reverse friction device for engagement, a cutoff/bypass valve 18 which is pilot-operated in response to a selection of a different speed friction device by the speed-selector valve 14 for initially cutting off flow to the direction-selector valve and for dumping the pressure acting to engage one of the direction-friction devices, a modulation rate regulating valve 20 for controlling the rate of modulation of the engagement of one or the other of the direction-friction devices and an orifice-selector valve 22, having a plunger mechanically interlocked, in a conventional manner by means indicated schematically by the dashed line 23 for movement together with a spool of the speed-selector valve 14, for selecting various orifices for register with a feedback conduit leading to the regulating valve 20 to thereby alter the modulation rate of the regulating valve for each of the selected speeds.

More specifically, it can be seen that the pump 12 delivers fluid to a branched supply conduit 24 having one end connected to a valve bore 26 of the speed-selector valve 14 by way of an inlet port 28. Located just rightwardly of the inlet port 28 is an outlet port 30. A valve spool 32 is reciprocably mounted in the bore 26 and when the spool is in a neutral position as shown, a land 34 at the right-hand end of the spool is in blocking relationship to the inlet port 28 while the outlet port 30 is in communication with a sump port 35 at the right-hand end of the bore. Also, a plurality of service ports intersecting the bore 26 are respectively connected to the friction devices A, B, C and D, and are connected to sump-connected ports at opposite ends of the service ports. The valve spool 32 may be shifted rightwardly from its neutral position to first, second, third and fourth speed positions, respectively, wherein the inlet port 28 is connected to the first speed, second speed, third speed, and fourth speed friction devices A, B, C, and D. For all positions of the valve spool 32, except for its neutral position, the outlet port 30 is connected for receiving fluid from the inlet port 28.

A conduit 36 has one end connected to the outlet port 30 and its other end connected to an inlet port 38 leading to a bore 40 of the cutoff/bypass valve 18. Located in the conduit 36 is an opening orifice 39 having a function described herein below. Intersecting the bore 40 at a location just rightwardly of the inlet port 38 is an outlet port 42 and intersecting the valve bore 40 at a location just rightwardly of the outlet port 42 is a sump port 44. Provided for controlling the flow of fluid among the ports 38, 42 and 44 is a valve spool 46. A coil-compression spring 48 is located in the valve bore and acts against the right-hand end of the valve spool 46 so as to urge the latter leftwardly into a closed or bypass position wherein it blocks or cuts off fluid communication between the inlet and outlet ports 38 and 42, respectively, while simultaneously opening the outlet port 42 to the sump port 44. Connected to the branched speed control fluid supply conduit 24 at a location between the speed-selector valve 14 and a flow control orifice 50, located in the conduit 24, is one end of a pilot-pressure conduit 52 having its other end connected to the left-hand end of the valve bore 40. Thus, whenever fluid pressure exists in the conduit 24, the spool 46 will be shifted rightwardly to its open position, as shown, wherein it connects the inlet port 38 to the outlet port 42 while blocking the latter from the sump port 44.

The fluid conducted through the cutoff/bypass valve 18 is conveyed to the direction-selector valve 16 by means of a branched direction control fluid supply conduit 54 having one end connected to the outlet port 42 and another end connected to an inlet port 56, leading to a valve bore 58 of the direction-selector valve 16. The inlet port 56 is located midway between a forward service port 60, which is spaced rightwardly of the inlet port, and a reverse service port 62, which is located leftwardly of the inlet port. A valve spool 64 is reciprocably mounted in the valve bore 58 and controls the flow of fluid such that the inlet port 56 is connected to one or the other of the service ports 60 and 62, while the remaining service port is connected to sump-connected ports at the opposite ends of the valve bore 58. The valve spool 64 is here shown in its forward position, wherein the inlet port 56 is connected to the forward service port 60 and the reverse service port 62 is connected to the sump-connected port at the left-hand end of the bore 58.

The pressure of the fluid in the branched direction-fluid supply conduit 54 is controlled by the modulation rate control valve 20 and to the end of accomplishing this purpose, one end of the supply conduit 54 is connected to an inlet port 66 which leads to a valve bore 68 of the control valve 20. Spaced rightwardly from the inlet port 66 is a sump port 70 and spaced leftwardly from the inlet port 66 is a transmission lubrication service port 72. The control valve 20 is in the form of a combined trim plug and pressure-regulating valve and includes a valve spool 74 reciprocably mounted in the bore 68 so as to control the relief of fluid from the inlet port 66 to one or the other or both of the sump ports 70 and the transmission lubrication service port 72. The valve spool 74 is here shown in its rightmost position wherein it blocks fluid communication between the inlet port 66 and the ports 70 and 72. The fluid pressure at the inlet port 66 is communicated with the right-hand end of the valve spool 74 by means of a passage 76 which extends internally within the spool 74. Leftward movement of the valve spool 74 is resisted by a pressure-regulating spring 78 having its opposite ends respectively engaged with a left-hand end of the valve spool 74 and the right-hand end of a piston or plug 80, which is reciprocably mounted within a cylindrical chamber 82 formed coaxially with and joined to the valve bore 68. In a manner to be presently described, the piston or plug 80 is stroked rightwardly against the resistance of a return spring 83 upon the selection of different speeds so as to effect modulation of the engagement of the selected direction-friction device. Such stroking of the piston 80 is accomplished by means of a feedback conduit 84 including a first section 86 connected between the direction control fluid supply conduit 54 and an inlet port 88 leading to a valve bore 90 of the orifice-selector valve 22 and a second section 92 having its opposite ends respectively connected to an outlet port 94 of the orifice-selector valve 22 and a control pressure inlet port 96 leading into the chamber 82 at a location leftwardly of the piston 80. The inlet port 88 and the outlet port 94 are located diametrically opposite from each other and the flow therebetween is controlled by means of a valve plunger 98 having first, second, third, and fourth speed orifices 100, 102, 104 and 106, respectively, therein, which are respectively moved into register with the inlet and outlet ports 88 and 94, concurrently with the spool of the speed-selector valve being moved into its first, second, third, and fourth speed positions. When the speed-selector valve 14 is in its neutral position, as shown, the valve plunger 98 is in its leftmost position, as shown, wherein the inlet and outlet ports 88 and 94 are in direct fluid communication with each other and with a drain passage 107 at the right-hand end of the valve bore 90. As the speed-selector valve 14 is shifted rightwardly from its neutral position sequentially to its first, second, third and fourth speed positions, the orifices 100, 102, 104 and 106 will sequentially be placed in register with the ports 88 and 94. Thus, the plunger 98 and the orifices cooperate to define a variable flow restrictor means and it will be appreciated that the rate at which feedback fluid flows from the supply conduit 54 to the chamber 82 is a function of the size of the orifice which is in register with the inlet and outlet ports 88 and 94, respectively.

The sizing of the orifices 100, 102, 104 and 106 is done such as to tailor the control system to a particular transmission and/or transmission duty cycle. For example, in most transmissions, the lowest speed change takes place when the transmission is shifted into first speed. Accordingly, a relatively fast engagement of the first speed forward and reverse friction devices may be tolerated and this is accomplished by choosing a relatively large orifice so that the modulation rate of the control valve 20 is increased at a relatively fast rate caused by a relatively fast rightward stroke of the piston or plug 80.

Assuming a duty cycle where it is common to shift directly to second speed without going through first speed, the speed change involved in going from neutral to second speed is greater than that for shifting from neutral to first speed and therefore a longer clutch engagement time is necessary and this is accomplished by making the size of the second speed orifice 102 smaller than that of the first speed orifice 100. However, in cases where it would be unusual to bypass the first speed when shifting to second speed, the speed change difference between first and second speeds may be less than that between neutral and first speed and therefore would dictate that the second speed orifice 102 be made larger than the first speed orifice 100 to thereby effect a faster rate of modulation and hence, a faster engagement of the forward or reverse direction-friction devices. As concerns the relative sizes of the third and fourth speed orifices 104 and 106, respectively, for most vehicle transmission applications, the orifice 104 would normally be smaller than the orifice 102 and larger than the orifice 106.

Thus, it will be appreciated that modulated engagement of a selected one of the direction-friction elements is repeated each time a new speed friction device is selected for engagement. This repetition of the modulation function requires that the pressure acting to engage the selected direction-friction element and to hold the piston 80 in its rightwardly stroked position be quickly drained to sump when shifting from one selected speed to another. To facilitate the quick draining of fluid pressure acting on the piston 80, a one-way valve 110 is provided in a passage 112 which interconnects the feedback conduit section 92 with the direction fluid supply conduit 54 and permits fluid to flow only from the conduit section 92 to the conduit 54. In a manner described in more detail below, the cuttoff/bypass valve 18 operates to establish a relatively unrestricted path for fluid to drain from the conduit 54 immediately following each new speed selection and thus, also acts to drain that fluid which enters the conduit 54 from the conduit section 92 by way of the one-way valve 110.

The operation of the transmission control system 10 is as follows. Assuming that the shift lever (not shown) is initially in a neutral position, the speed-selector valve 14 and the orifice-selector valve 22 will be in their respective leftmost "neutral" and inoperative positions, as shown. Fluid supplied by the pump 12 will then be blocked from entering the speed-selector valve 14 and hence, the direction-selector valve 16 and associated conduits will be void of fluid. The pump pressure will be conveyed to the left end of the bore 40 of the cutoff-/bypass valve 18 by the conduit 52 and consequently, the spool 46 will be in its rightwardly shifted open position, as shown, wherein it interconnects the inlet port 38 with the outlet port 42. The orifice-selector valve plunger 98 will, at this time, be in its leftmost position, as shown, wherein it connects the ports 38 and 42 and feedback conduit 84 in communication with the sump port 107 at the right-hand end of the bore 90.

If it is then desired to place the transmission in a first speed, forward driving condition, it is necessary only to move the shift lever to the forward drive leg of the shift gate and then to the first speed position in that leg to thereby shift the spool 32 of the speed-selector valve 14 rightwardly into its next detented position which is its "first" speed position wherein it connects the inlet port 28 to the first speed friction device A by means of the first speed service port; and to shift the direction-selector valve 16 to its "forward" position, as shown, wherein it interconnects the inlet port 56 with the forward service port 60 while interconnecting the reverse service port 62 with the sump port at the left end of the bore 58. Since the element A is initially void of pressure, pressure in the pilot-pressure conduit 52 will drop, it being noted that the orifice 50 enhances this pressure drop. The pressure in the left-hand end of the bore 40 of the cutoff/bypass valve 18 drops as the pressure in the conduit 52 drops and thus, the spring 48 operates to return the spool 46 to its bypass or closed position wherein the feedback pressure conduit 84 and direction control fluid supply conduit 54 are both connected to sump. Because the feedback pressure conduit 84 and the branched direction control fluid supply conduit 54 are initially both connected to the sump, during filling of the actuating cylinder of the first speed friction device, no fluid pressure is available for the engagement of the forward direction-friction device.

As the first speed friction device approaches full engagement, the pressure in the conduit 52 will rise. This increase in pressure will shift the spool 46 of the cutoff/bypass valve 18 rightwardly to its open position wherein it interconnects the inlet and outlet ports 38 and 42. It is here noted that the orifice 39 acts to constantly maintain a back pressure in the conduit 52 so as to ensure the smooth opening of the valve 18. The fluid, then, begins to flow to the direction-selector valve 16 by way of the conduit 54. The rate at which flow and pressure occur in the direction clutch circuit is influenced by the orifice 39 such that the inertia of the selected direction-friction device and the inertia of the piston 80 and other pressure-shiftable components of the modulation rate regulating valve 20 is overcome gradually. Since the spool 64 of the valve 16 is still in its "forward" direction position, fluid is directed to begin filling the cylinder of the forward friction device. The resistance of the forward friction device, to becoming engaged, will result in a pressure increase occuring in the conduit 54 and hence, in pressure being routed to the right-hand end of the valve spool 74 of the modulation rate control valve 20 so as to cause the pressure to increase in the conduit 54 in accordance with the resistance offered by the pressure-regulating spring 78. At the same time, fluid flows through the feedback conduit 84 to the chamber 82 to cause the piston 80 to shift rightwardly to increase the setting of the pressure-regulating spring 78 at a continually increasing ratio governed by the size of the first speed orifice 100, it being noted that the selection of the orifice 100 was made concurrently with the selection of the first speed since the speed-selector spool 32 is connected to the orifice-selector spool for movement together. When full engagement pressure is realized in the conduit 54, the piston 80 will be in its rightmost position within the chamber 82. Thus, the rate at which pressure builds up in the cylinder of the forward direction-friction device is proportional to the rate at which the piston 80 shifts rightwardly and hence, is also proportional to the size of the orifice in the first speed orifice element 100.

The transmission may then be placed in its second speed forward driving condition by again shifting the valve spool 32 of the speed-selector valve 14 rightwardly to its next adjacent detent position, which is its "second" speed position. Such shifting of the spool 32 results in the first speed service port being connected to the sump and the second speed service port being connected to the inlet port 28. The orifice-selector plunger 98 is shifted rightwardly, concurrently with the spool 32, so as to align the orifice 102 with the inlet and outlet ports 88 and 94 of the orifice-selector valve 22. The pressure in the pilot-pressure conduit 52 drops immediately upon the spool 32 being shifted to its new position since the cylinder of the second speed friction device is initially void of fluid. When the pressure drops in the conduit 52, a similar drop occurs in the left end of the bore 40 of the cutoff/bypass valve 18 and the valve spool 46 is shifted leftwardly to its closed position by the spring 48. With the spool 46 in its closed position, the outlet port 42 and consequently the pressure in the branched direction control fluid supply conduit 54 is connected to the sump port 44. As the pressure in the conduit 54 drops, the oneway valve 110 will open so as to connect the conduit 84 to the conduit 54. Thus, the pressure-engaged forward direction-friction device becomes disengaged and the control pressure chamber 82 becomes depressurized in the area to the left of the piston 80 which results in the piston 80 being shifted leftwardly by the return spring 83. As the cylinder of the second speed friction device becomes filled, the pressure in the pilot pressure conduit 52 and the left-hand end of the valve bore 40 will increase and cause the valve spool 46 to once again be shifted rightwardly to its "open" position wherein it connects the inlet port 38 to the outlet port 42. The forward direction-friction device is then re-engaged with the pressure being modulated in the same manner described above, relative to the engagement of the forward direction-friction device after the shift of the speed-selector valve spool from its neutral to its first speed position except the rate of modulation may be different due to the orifice of the second speed orifice 102 being of a different size than the orifice of the first speed orifice 100.

The transmission may be shifted to third and fourth forward drive speed conditions by respectively shifting the speed-selector valve spool 32 to its third and fourth speed positions which initially effects disengagement of the forward direction-friction device during filling of the cylinder of the selected speed friction device and then effects re-engagement of the forward direction clutch or brake device at a modulated rate determined by the size of the orifice of the selected speed orifice element.

The transmission may be shifted to a reverse drive mode from a forward drive mode by manipulating the control lever to first return the speed-selector valve 14 to its neutral position and then to move the direction-selector valve 16 to its reverse position while moving the speed-selector valve 14 to a selected speed position. Engagement of the selected speed friction device and the reverse friction device is then accomplished in a manner similar to that described above for forward drive operation.

By having the engagement of only the direction-friction devices being modulated, wear and heat buildup are limited just to them, which makes it possible to use a smaller fluid supply pump since cooling fluid is required for only two devices.

By having the modulation rate tailored to the normal duty cycle of the transmission so that the rate is relatively slow when the speed change of the transmission gearing is the greatest and the rate is relatively fast when the speed change of the transmission is the least, productivity and operator comfort are enhanced and power-train component wear is minimized.

I claim:

1. A hydraulic transmission control system for selectively actuating at least one of a plurality of speed friction devices and for selectively actuating one of a plurality of direction-friction devices, comprising: a fluid source; a speed-selector valvve connected for communicating the source to one of the speed friction devices; a direction-selector valve connected for communicating the source to one of the direction-friction devices; a hydraulically responsive pressure-modulating valve connected in fluid communication with the direction-selector valve for modulating the fluid communicated to the direction-selector valve from the source; said modulating valve including a valve element and a pressure-regulating spring biasing the valve element in a first direction and a piston engaged with the spring and shiftable in the first direction for increasing the resistance of the pressure-regulating spring to movement of the valve element in a second direction opposite to the first direction; a source of increasing fluid pressure directed along a fluid path leading to the piston for shifting the latter in the first direction; and an orifice-selector valve located in the fluid path and connected to the speed-selector valve for being operated concurrently with the latter for disposing a different orifice of a selected size in the fluid path for each speed position of the speed-selector valve to thereby regulate the rate that the source of increasing fluid pressure is communicated to the piston and thus, to thereby control the rate of movement of the piston in the first direction and hence, the rate of increase in the pressure of the fluid controlled by the modulating valve.

2. The transmission control system defined in claim 1 wherein the fluid source is communicated to the direction-selector valve by way of a second fluid path passing through the speed-selector valve and a cutoff-/bypass valve means; said cutoff/bypass valve means including a shiftable element means connected to the fluid source communicated to the speed-selector valve and being normally in a closed position, blocking flow through the second path, while communicating the direction-selector valve with sump, and being pressure-shiftable to an open position permitting the flow of source fluid to the direction-selector valve only upon the pressure of the fluid being communicated to the speed-selector valve reaching a predetermined minimum value indicative of at least partial engagement of a selected speed friction device.

3. In a hydraulic control system for a power shift transmission of a type having a plurality of speed friction devices, and forward and reverse direction-friction devices, a source of fluid pressure, a speed-selector valve connected for selectively communicating the source with one of the speed friction devices and a direction-selector valve connected for selectively communicating the source with one or the other of the forward and reverse direction-friction devices, an improved modulating circuit for modulating the engagement of the forward and reverse direction-friction devices, comprising: said source being communicated to the direction-selector valve by a fluid path extending between the speed-selector valve and direction-selector valve; a pilot-operated cutoff/bypass valve means being connected in the fluid path and to fluid being communicated to the speed-selector valve from the source for establishing an open passage through the path, in response to a predetermined minimum pressure of the fluid being communicated to the speed-selector valve, and for blocking the fluid path and draining the fluid path downstream from the cutoff/bypass valve means in response to the pressure of the fluid being communicated to the speed-selector valve from the source falling below said predetermined minimum pressure, whereby the direction-friction devices are automatically disengaged with each new speed friction device selection; a pressure-modulating valve means being connected to the fluid path downstream of the cutoff/bypass valve for modulating the increase in fluid pressure communicated to the forward and reverse friction devices; said modulating valve means including a pressure-regulating spring and a piston arranged for increasingly loading the regulating spring during engagement of the forward and reverse friction devices; a feedback conduit connected between the piston and the fluid path downstream from the cutoff/bypass valve means; and an orifice-selector valve means connected in the feedback conduit and connected for simultaneous operation with the speed-selector valve for interposing a different sized orifice in the feedback conduit for each speed selected by the speed-selector valve, whereby the rate of increase of the modulating pressure is varied for each speed selection in accordance with the selected orifice size.

4. The hydraulic control system defined in claim 3 and further including a fluid passage interconnecting the feedback conduit and the fluid path at a location downstream from the cutoff/bypass valve; and a one-way valve located in the fluid passage for permitting fluid to flow only from the feedback conduit to the fluid path, whereby the pressure in the feedback conduit will also be drained anytime the cutoff/bypass valve means is positioned for drawing the fluid path downstream of the cutoff/bypass valve.

5. A hydraulic control system for a power shift transmission of a type requiring actuation of one each of a plurality of speed friction devices and of a plurality of direction-friction devices to establish power flow through the transmission, comprising: a source of fluid pressure; a sump; a speed-selector valve means connected to the source of fluid pressure and to the sump and including a plurality of service ports respectively adapted for connection to the plurality of speed friction devices, the speed-selector valve means including valve element means selectively operable for connecting the source of fluid pressure to one of the plurality of service ports while connecting the remaining service ports to the sump; a direction-selector valve means connected to the source of fluid pressure and including reverse and forward direction service ports respectively adapted for connection to reverse and forward direction-friction devices; a modulating valve means coupled to the direction-selector valve means for regulating the rate of pressure rise at a direction-selector valve means in response to receiving pilot fluid pressure at a predetermined rate; a pilot fluid pressure source; a modulation rate control valve means connected to the pilot fluid pressure source and to the modulating valve for controlling the rate of flow of pilot fluid pressure to the modulating valve; said modulating rate control valve means including a variable flow restrictor means; and interlocking means connected between the speed-selector valve means and the variable flow restrictor means for automatically varying the restriction of flow to the modulating valve in response to at least the selection of some of the plurality of speed friction devices by operation of the speed-selector valve means.

* * * * *